A. MONROE.
MOWING MACHINE.
APPLICATION FILED OCT. 8, 1909.

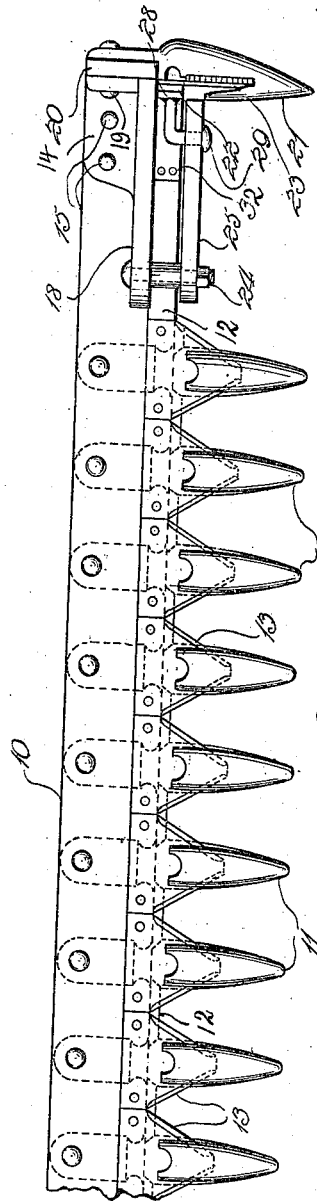
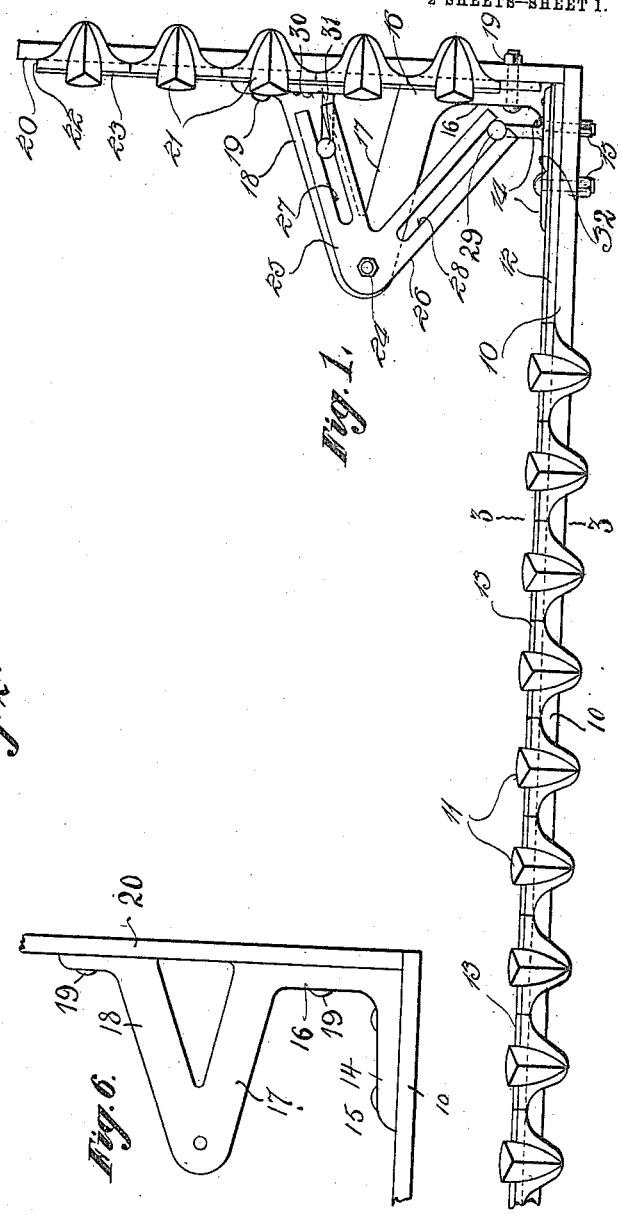
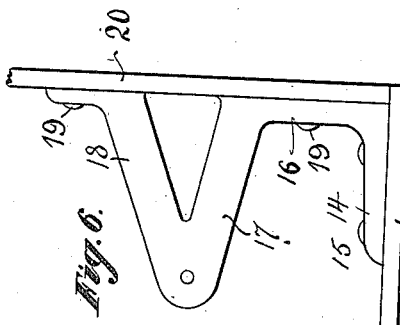

987,588.

Patented Mar. 21, 1911.
2 SHEETS—SHEET 2.

Witnesses
C. C. Chandler.
C. N. Woodward.

Inventor
Antime Monroe.
By Chandler & Chandler
Attorneys.

UNITED STATES PATENT OFFICE.

ANTIME MONROE, OF PORTLAND, OREGON.

MOWING-MACHINE.

987,588.   Specification of Letters Patent.   Patented Mar. 21, 1911.

Application filed October 8, 1909. Serial No. 521,672.

*To all whom it may concern:*

Be it known that I, ANTIME MONROE, a citizen of the United States, residing at Portland, in the county of Multnomah, State of Oregon, have invented certain new and useful Improvements in Mowing-Machines; and I do hereby declare the following to be a full, clear, and exact description of the invention, such as will enable others skilled in the art to which it appertains to make and use the same.

This invention relates to improvements in mowing machines, and has for one of its objects to provide a simply constructed device of this character whereby the tangled hay or grass at the outer end of the sickle may be severed at the same time that the sickle is actuated, and all danger of the clogging of the sickle obviated.

Figure 3:
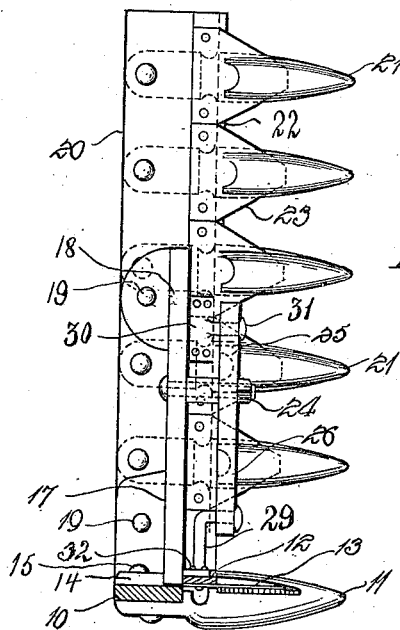
Figure 4:
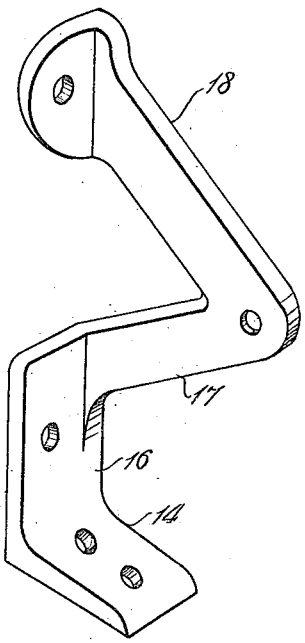
Figure 5:
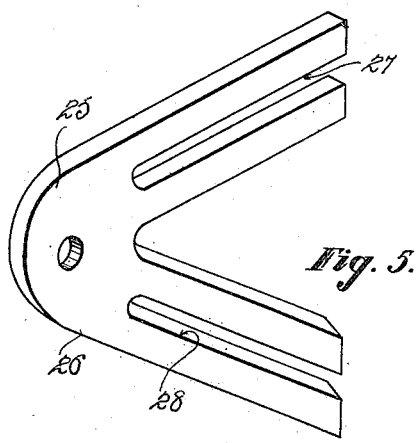

With this and other objects in view, the invention consists in certain novel features of construction as hereafter shown and described and then specifically pointed out in the claim, and in the drawings illustrative of the preferred embodiment of the invention, Figure 1 is a front elevation of a part of the sickle portion of a mowing machine, with the improvement applied. Fig. 2 is a plan view of the same. Fig. 3 is a section on the line 3—3 of Fig. 1. Fig. 4 is a perspective view, enlarged, of the combined coupling bracket and bell crank lever support. Fig. 5 is an enlarged perspective view of the bell crank lever, detached. Fig. 6 is a side elevation of the combined coupling bracket and bell crank lever support together with portions of the supporting frame, to illustrate its construction more fully.

The improved device may be connected to any of the various makes of mowing machines without material structural changes either in the machine or in the improved attachment, and it is not desired therefore to limit the invention to any specific construction of mowing machine, but for the purpose of illustration the improved device is shown applied to a portion of a conventional mowing machine sickle mechanism, and in the drawings, the horizontal finger bar is represented as a whole at 10, and provided with the usual fingers 11. Operating upon the finger bar 10 is the main horizontal sickle knife head 12 having the sickle knives 13, these parts being of the usual construction. Located at the outer end of the finger bar 10 is a bracket member comprising a horizontal portion 14 bolted or otherwise secured, as shown at 15, to the finger bar and provided at its outer end with a vertical base portion 16 and having an inwardly directed projection 17. Extending from the free end of the projection 17 is an inclined portion 18, the portions 17—18 forming an extension to the bracket, whose free end extends over the finger bar 10 and is spaced therefrom, as shown. Secured by bolts 19 or other suitable fastening devices to the portions 16—18 is a vertical supplemental finger bar 20, the supplemental finger bar being thus rigidly supported at right angles to the main horizontal finger bar 10. The supplemental finger bar 20 is provided with a plurality of spaced fingers 21, and mounted for vertical reciprocal movement upon the supplemental finger bar is a supplemental sickle head 22 and supplemental sickle knives 23.

One side of the horizontal portion 14 of the bracket forms a guide or support for the adjacent edge of the horizontal sickle bar or head, while the vertical portion 16 and the angular portion 18 of the bracket forms a support and guide for the vertical or supplemental sickle bar 20. By this means as the sickle bars are actuated they are guided and supported from lateral movement in one direction by the bracket. This is an important feature of applicant's device and adds materially to its utility and efficiency.

Pivoted at 24 to the free end of the extension 17—18 is a bell crank lever comprising two arms 25—26, the arm 25 having a longitudinal slot 27, while the arm 26 is provided with a similar longitudinal slot 28. Connected to the main sickle head 12 is a coupling device comprising a base portion 32 riveted or otherwise secured to the sickle head 12 and provided with a laterally extending pin 29 at its upper end over which the slot 28 operates, while a similar base 30, having a lateral pin 31 is connected to the supplemental sickle head 22 and is engaged by the slot 27. By this simple means it will be obvious that the reciprocal movement of the main sickle head 12 will be communicated to the vertical sickle head 22, and thus cause any tangled hay or grass, through which the device is moved, to be severed in a vertical line at the outer side of the swath, and the main finger bar thus effectually prevented from becoming clogged by such tangled grass or hay.

The improved device is simple in construction, can be inexpensively manufactured and applied, and obviates all danger of the clogging of the main finger bar by tangled hay or grass, as the vertical supplemental sickle device cuts a smooth vertical wall between the standing hay and the swath which has been cut by the main sickle mechanism.

What is claimed is:—

An attachment for mowing machines, comprising in combination, an L-shaped bracket having an extension on one arm, bent to form an inwardly extending V, a vertical finger bar secured to this arm above and below the V, a horizontal finger bar secured to the other arm, a vertical sickle bar slidable in said vertical finger bar, a horizontal sickle bar slidable in said horizontal finger bar, a bell-crank lever pivotally carried in the point of the V-shaped extension and having longitudinal slots in its arms, a stud carried by the horizontal sickle bar and adapted to engage one of said slots, and a stud carried by the vertical finger bar and adapted to engage the other of said slots.

In testimony whereof, I affix my signature, in presence of two witnesses.

ANTIME MONROE.

Witnesses:
NAPOLEON MONROE,
FRANK T. BERRY.

---

Copies of this patent may be obtained for five cents each, by addressing the "Commissioner of Patents, Washington, D. C."